United States Patent [19]
Malik

[11] Patent Number: 5,298,054
[45] Date of Patent: Mar. 29, 1994

[54] PRESSURE AND TEMPERATURE SWING ADSORPTION SYSTEM

[75] Inventor: Ram L. Malik, Fremont, Calif.

[73] Assignee: FMC Corporation, Chicago, Ill.

[21] Appl. No.: 970,525

[22] Filed: Nov. 2, 1992

Related U.S. Application Data

[63] Continuation of Ser. No. 863,335, Apr. 2, 1992, abandoned, which is a continuation of Ser. No. 753,023, Aug. 26, 1991, abandoned, which is a continuation of Ser. No. 590,750, Oct. 1, 1990, abandoned.

[51] Int. Cl.$^5$ .......................................... B01D 53/04
[52] U.S. Cl. ........................................ 95/99; 95/104; 95/106; 95/115; 95/116; 95/142; 96/128; 96/133; 96/142
[58] Field of Search ............... 55/20, 21, 25-28, 55/62, 68, 74, 161-163, 179, 208, 387

[56] References Cited

U.S. PATENT DOCUMENTS

| | | | |
|---|---|---|---|
| H1,108 | 10/1992 | Wynveen et al. | 55/28 |
| 2,253,907 | 8/1941 | Levine | 55/208 X |
| 3,016,978 | 1/1962 | Hull | 55/208 X |
| 3,124,438 | 3/1964 | Lavery | 55/20 |
| 3,186,144 | 6/1965 | Dow | 55/62 X |
| 3,206,918 | 9/1965 | Robinson | 55/62 X |
| 3,238,701 | 3/1966 | Holt | 55/62 X |
| 3,241,294 | 3/1966 | Walker et al. | 55/62 X |
| 3,243,938 | 4/1966 | Lavery et al. | 55/62 X |
| 3,335,546 | 8/1967 | Wünning | 55/62 X |
| 3,335,550 | 8/1967 | Stern | 55/208 |
| 3,527,024 | 9/1970 | McMinn et al. | 55/62 |
| 3,540,188 | 11/1970 | Barrere, Jr. et al. | 55/20 |
| 3,636,679 | 1/1972 | Batta | 55/62 X |
| 3,708,956 | 1/1973 | Norbäck | 55/208 X |
| 3,713,272 | 1/1973 | Barrere, Jr. et al. | 55/62 X |
| 3,734,293 | 5/1973 | Biskis | 55/208 X |
| 3,738,087 | 6/1973 | McCombs | 55/62 X |
| 3,922,149 | 11/1975 | Ruder et al. | 55/25 X |
| 3,950,154 | 4/1976 | Henderson et al. | 55/179 |
| 4,008,058 | 2/1977 | Wischer et al. | 55/208 X |
| 4,329,158 | 5/1982 | Sircar | 55/26 |
| 4,406,675 | 9/1983 | Dangieri et al. | 55/26 |
| 4,428,372 | 1/1984 | Beysel et al. | 55/25 X |
| 4,543,109 | 9/1985 | Hamlin et al. | 55/25 |
| 4,732,579 | 3/1988 | Vehman et al. | 55/26 X |
| 4,769,051 | 9/1988 | Defrancesco | 55/208 X |
| 4,775,484 | 10/1988 | Schmidt et al. | 55/28 X |
| 4,786,294 | 11/1988 | Jonqueres et al. | 55/28 |
| 4,793,832 | 12/1988 | Veltman et al. | 55/26 X |
| 4,881,958 | 11/1989 | Eckardt et al. | 55/208 X |

Primary Examiner—Robert Spitzer
Attorney, Agent, or Firm—M. Lee; R. C. Kamp; R. B. Megley

[57] ABSTRACT

A pressure swing and temperature swing adsorption system is disclosed which continuously purges contaminants such as nuclear, biological and chemical warfare agents from intake air and provides cool clean air to the crew compartment of a vehicle by progressively directing contaminated air through a first adsorption bed to clean the air, while simultaneously directing hot exhaust gases at about 600° F. through a second adsorption bed for purging contaminants therefrom, while simultaneously cooling a third adsorption bed for enhancing adsorption of contaminants in the purging bed upon repeating the cycles of operation.

4 Claims, 4 Drawing Sheets

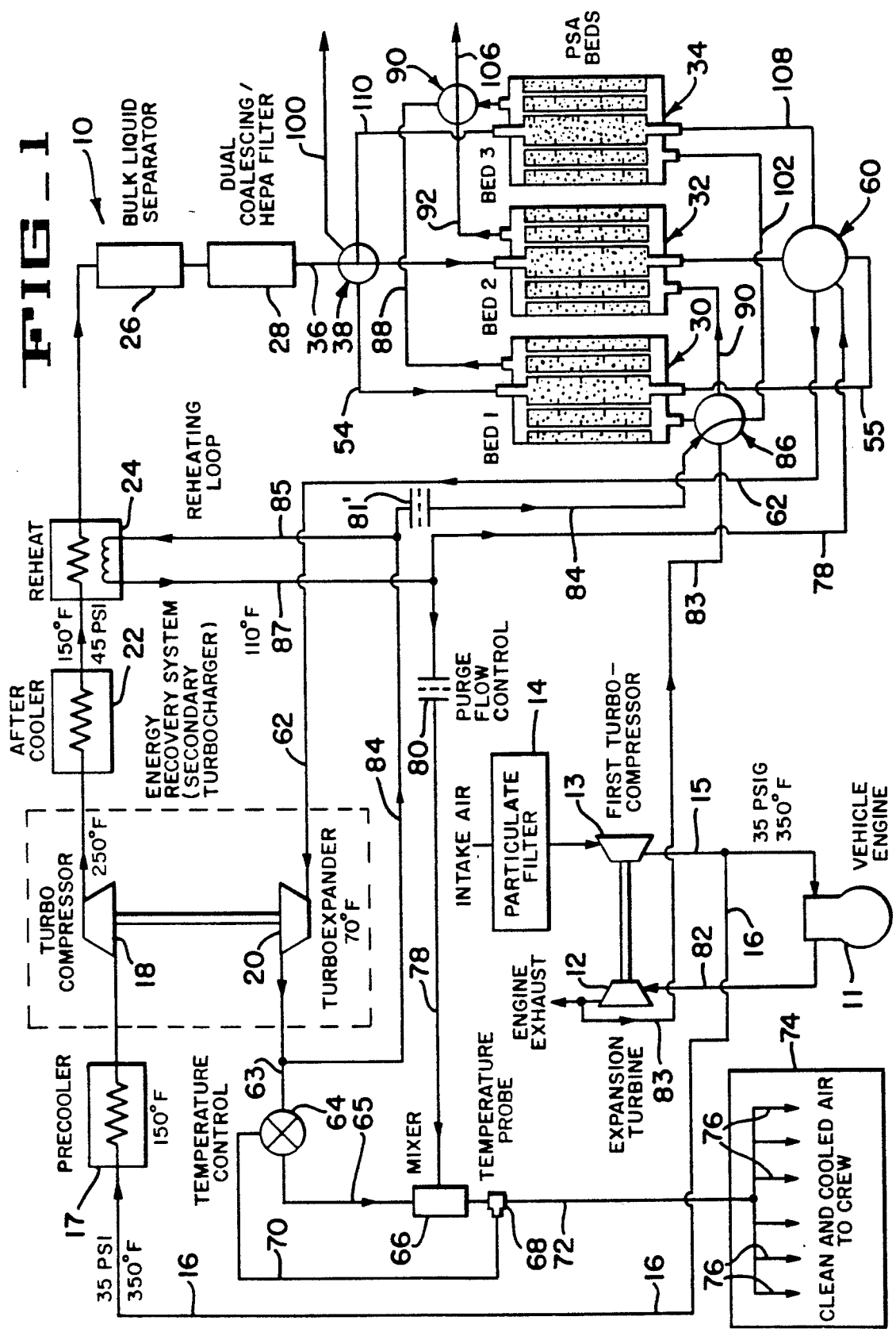

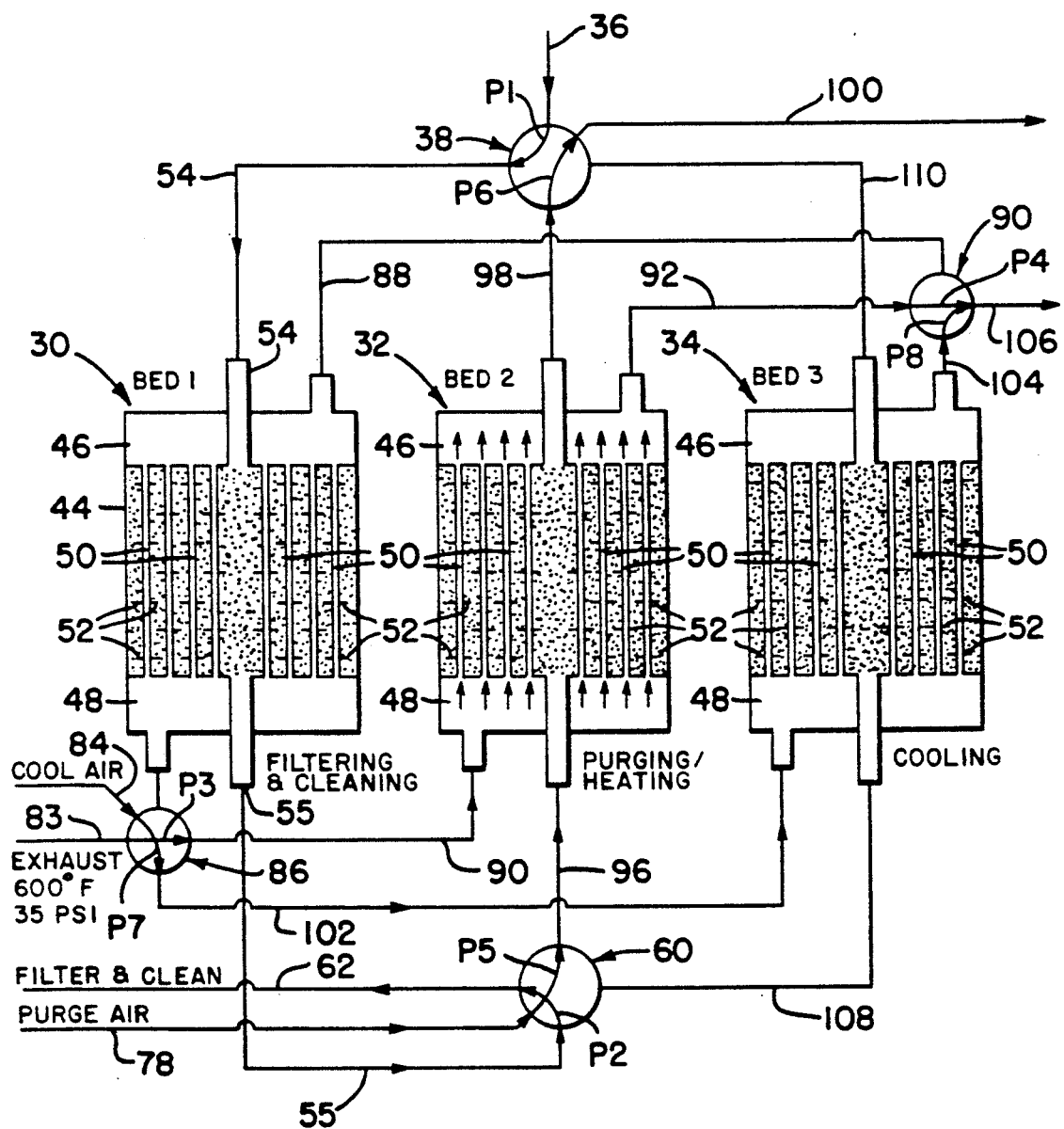

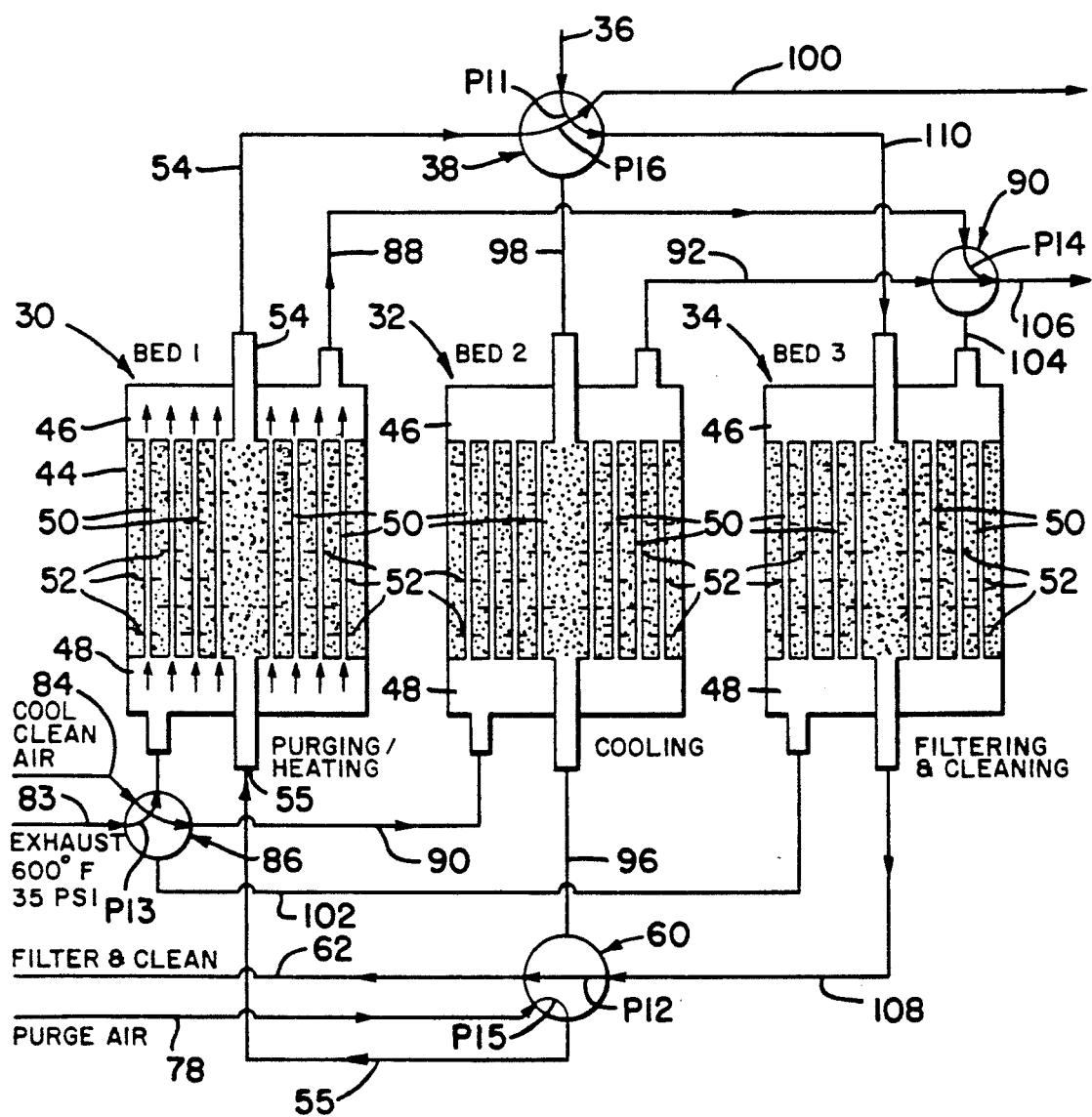

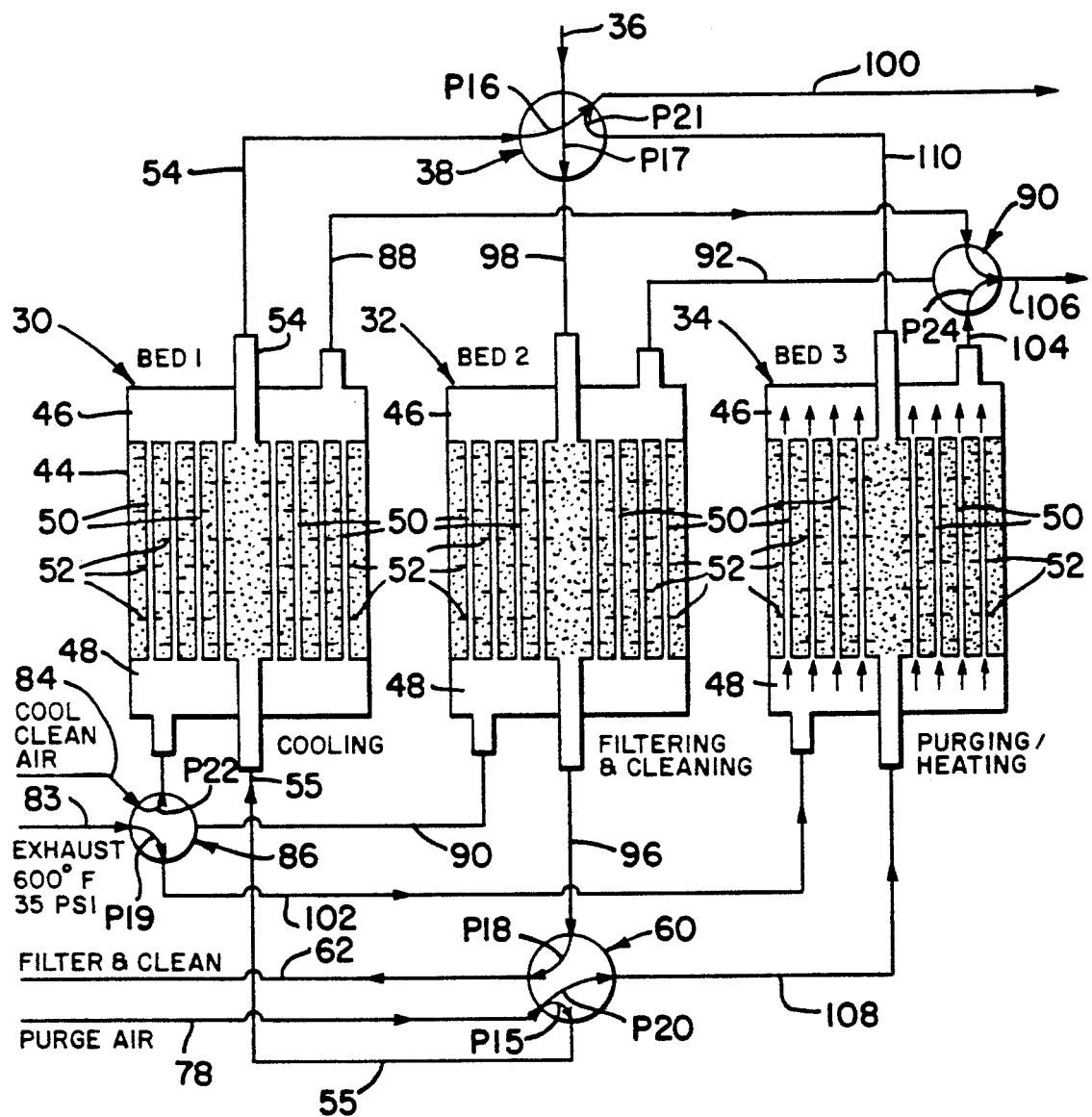
FIG_4

PRESSURE AND TEMPERATURE SWING ADSORPTION SYSTEM

This application is a continuation of application Ser. No. 07/863,335, filed on Apr. 2, 1992, now abandoned, which is a continuation of application Ser. No. 07/753,023, filed on Aug. 26, 1991, now abandoned, which is a continuation of application Ser. No. 07/590,750, filed on Oct. 1, 1990, now abandoned.

BACKGROUND OF THE INVENTION

1. Field of the Invention

The present invention relates to method and apparatus for purifying and thereafter continuously controlling the temperature of a three bed PSA/TSA filtering system which receives air containing hazardous nuclear, biological and chemical warfare agents, and supplying cool clean air to personnel within the crew compartment of a combat vehicle or the like by use of combined pressure swing and temperature swing adsorption technology.

2. Description of the Prior Art

Assignees Veltman et al U.S. Pat. Nos. 4,732,579 and 4,793,832 disclose air purification and temperature controlling systems and methods which use only pressure swing adsorption systems that include two adsorption beds.

SUMMARY OF THE INVENTION

The pressure and temperature swing adsorption system of the present invention combines a pressure swing adsorption system with a temperature swing adsorption system for continuously removing hazardous nuclear, biological and chemical warfare agents from the air before the air is directed into the crew compartment and/or conventional suits and masks worn by the crew of a military vehicle. The cleaned air is directed to the crew at a desire temperature such as about 70° F. and provides the crew with a source of clean cool air within the crew compartment. The combined pressure and temperature swing adsorption system uses three pressure swing adsorption beds, each of which moves gases sequentially through a filtration cycle, a purge and heating cycle, and a cooling cycle resulting in sequentially filtering and cleaning, purging and heating, and cooling of each bed for providing beds having a continuous life and providing a continuous supply of clean air to the crew at a desired temperature.

BRIEF DESCRIPTION OF THE DRAWINGS

FIG. 1 is a diagrammatic view of the pressure and temperature swing adsorption system of the present invention.

FIG. 2 is an enlarged diagrammatic section of three pressure swing adsorption beds illustrating valves positioned for directing a filtering and cleaning fluid through a first bed; a purging and heating fluid through a second bed; and a cooling fluid through a third bed.

FIG. 3 is similar to FIG. 2 except that the valves are positioned so that the first bed accepts the purging and heating fluids through the first bed, cooling fluids through the second bed, and filtering and cleaning fluids through the third bed.

FIG. 4 is the same as FIG. 2 except that the valves are positioned so that cooling fluids pass through the first bed, filtering and cleaning fluids pass through the second bed, and purging and heating fluids pass through the third bed.

DESCRIPTION OF THE PREFERRED EMBODIMENT

The pressure and temperature swing adsorption system 10 (FIG. 1) of the present invention is intended for use in combat vehicles (not shown) for continuously, effectively and economically removing nuclear, biological and chemical contamination from air while controlling the temperature of the air for providing clean air at about 70° F. to the crew compartment of the vehicle and/or to conventional suits and masks (not shown) worn by the crew of the vehicle. It will be understood, however, that the system may be used in other environments where combustion power means, such as an engine; or from other sources of compressed air and hot exhaust gases, such as turbine bleed air from a turbine powered vehicle, jet aircraft power units, or similar power means. For example, the system may be used to provide clean cool air to one or more people in buildings, aircrafts, ships and private or commercial vehicles.

The system 10 (FIG. 1) includes a power source of anyone of the types mentioned above, which power source will hereinafter be called an engine 11. A first portion of the engine exhaust gas drives a conventional expansion turbine 12 which drives a first turbo-compressor 13 that receives intake air that may be contaminated air. The intake air first passes through a particulate filter 14 which removes particulates from the air such as dust or sand. The intake air then moves into the first turbo-compressor 13 which compresses the air and directs a portion of the compressed air into the vehicle engine 11 through a conduit 15 at about 35 PSIG and 350° F.

A second portion of the bleed air flows through a conduit 16 into a first precooler 17 at about 35 PSIG and a temperature of about 350° F. The precooler 17 cools the air to about 150 °F. at 35 PSI gage, and directs the air to a second turbo-compressor 18 which heats the air to about 250° F. and drives a turbo-expander 20 which cools the air. The hot contaminated air from the turbo-compressor 18 is directed into an after cooler 22 and is discharged at a temperature of about 150° F. and a pressure of about 45 PSIG into a reheater 24 which provides contaminated air at about 100° F. and 45 PSIG. The contaminated air then passes through a bulk liquid separator 26 which separates condensed vapors from incoming air and discharges the separated fluids externally of the combat vehicle through a pressure drain (not shown). The air then passes through a dual coalescing HEPA filter 28 which directs the separated contaminated fluids externally of the vehicle. The bulk liquid separator 26 and coalescing filter 28 protects three adsorption beds 30, 32 and 34 of the pressure and temperature swing adsorption system 10 from excessive adsorption of liquids and solids.

The contaminated air discharged from the dual coalescing filter 28 flows through a conduit 36 into a double row multiple passage bed feed valve 38 having a plurality of passages therein which will be described later.

As indicated previously, the hot compressed exhaust gases from the engine 11 drives the expansion turbine 12 and the first turbo-compressor 13 which directs contaminated air through conduits 15 and 16, the precooler 17, turbo-compressor 18, after cooler 22, reheater 24, bulk liquid separator 26 and filter 28 into the multiple passage valve 38. The above described components are ed to the pressure swing portion of the temperature and pressure swing adsorption system 10.

Another portion of the compressed exhaust gas, compressed air and cooled air are directed through the three adsorption beds 30, 32 and 34 for performing different functions at different times as will be described in detail hereinafter.

Contaminants are purged from each bed, one at a time, using hot exhaust gases at about 600° F. at a pressure of about 35 PSIG which defines the temperature swing adsorption portion of the present invention.

As diagrammatically illustrated in FIGS. 1, 2 3 and 4, all adsorption beds 30, 32 and 34 are identical, but operate in different sequences, and accordingly only the bed 30 (FIG. 2) will be described in detail.

The bed 30 includes a housing 44 (FIG. 2) having an upper manifold 46 and a lower manifold 48 interconnected by a plurality of conduits 50 having heat transmitting fins 52 (only a portion being shown) thereon. A contaminated gas inlet conduit 54 is illustrated as being connected to the valve 38 and extending through the manifold 46, thus directing the contaminated air directly into the filtering material of the pressure and temperature swing BED 1. A clean air outlet conduit 55 extends from the bed through the outlet manifold 48.

The sequence of operation of the BEDS 1, 2 and 3 (FIG. 2) is: first; filter and clean the incoming air; second, purge and heat with hot exhaust gases at about 600° F.; and third, cool the bed to prepare the bed to more effectively filter and clean the next portion of contaminated gas. As indicated in FIGS. 2, 3 and 4, each BED 1, 2 and 3 simultaneously performs different functions of the three cycles, with the cycle time of each step being in the range between five to ten seconds, preferably at seven second intervals.

Having reference to FIG. 2, contaminated air flows from conduit 36, through a first passage P1 in valve 38, through the conduit 54, and directly into and through the filtering material of BED 1. The filtered and clean air then passes through the conduit 55, a first passage P2 in a double row multi-passage valve 60, a conduit 62 (FIGS. 1 and 2) to the turbo-expander 20 (FIG. 1) which is driven by the turbo-compressor 18.

The turbo-expander 20 cools the air to about 70° F. and directs it through a conduit 63, a temperature controller 64, conduit 65, and a mixer 66. The temperature controller 64 is connected to a temperature probe 68 by a conduit 70, and the controller 64 may be adjusted to provide a desired air temperature for the crew in summer between about 60°-70° F., and in winter at about 90°-100° F. The mixer 66 directs cool air through a conduit 72 and into a crew compartment 74 of a vehicle (not shown) through a plurality of orifices 76.

A conduit 82 receives a portion of the hot exhaust gas from the engine 11 and directs it through conduit 83 to a valve 86.

Cool clean air from a conduit 84 (FIG. 1) passes through a conduit 85 into a heating coil in the reheater 24 which heats a portion of the air from conduits 84 and 85 to about 110° F. which flows through a conduit 87 to conduit 78. This heated air passes through the purge flow control valve 80, conduit 78, mixer 66 and temperature probe 68 to provide cool clean air during the bed cooling cycle, and to provide winter temperatures to the crew compartment 74 at between about 90°-100° F., and summer temperatures between about 60°-70° F. by appropriate adjustment of the temperature control 64.

A portion of the cool air from conduit 84 also flows through a flow control valve 81' in conduit 84 and into the double row multiple-way valve 86.

As above described, the contaminated air from outside the system is first filtered in BED 1, is purged/heated in BED 2, and is cooled in BED 3. These functions take place simultaneously during a period of time of between five to ten seconds, preferably about seven seconds.

Contaminated air from conduit 36 (FIGS. 1 and 2) is directed through passage P1 in valve 38 and flows through conduit 54 into and through the filtering material in BED 1 which filters the contaminates from the air. The clean air is discharged through conduit 55, a passageway P2 in multiple row valve 60 and through conduit 62 for providing clean cool air to the crew compartment 74 and through conduits 63, 84 and valve 86 (FIG. 1) for cooling the filtering material in BED 3.

Simultaneously with the filtering and cleaning of BED 1, BED 2 receives hot exhaust gases at about 600° F. and 35 psi from conduit 83, a passage P3 (FIG. 2) in valve 86, which hot gases flow through conduit 90 and into the lower manifold 48 of BED 2. The hot exhaust gases then flow through the conduits 50 in BED 2 which transmits heat to the filtering material of BED 2 through the conduits 50 and fins 52. The hot gases then enter the upper manifold 46 of BED 2 and flow through a conduit 92 and a passage P4 in valve 90 to the atmosphere through conduit 106 thus heating the filtering material in BED 2. At the same time, purge air from conduit 78 (FIGS. 1 and 2) flows through a passage P5 in valve 60 and a conduit 96 through the filtering material in BED 2 and through a conduit 98, and a passage P6 in valve 38 for discharge to the atmosphere through conduit 100 thus performing the purging operation of BED 2.

While BED 1 is filtering and cleaning and BED 2 is purging and heating, BED 3 is being cooled. Clean cool air at about 70° F. is directed through conduit 84, through a passage P7 (FIG. 2) in valve 86, which clean air flow through a conduit 102 and enters the lower manifold 48 of BED 3 and flows through the conduits 50 and into the upper manifold 46 for cooling the filtering material in BED 3. The cooling air is discharged to the atmosphere through conduit 104, a passage P8 in valve 90 and to the atmosphere through conduit 106.

After about seven seconds of directing the several fluids into BEDs 1, 2 and 3 of FIG. 2, the valves are shifted to cause BED 1 (FIG. 3) to be subjected to purging and heating fluid; BED 2 is subjected to cooling fluid; and BED 3 is receiving contaminated air from the atmosphere for filtering and cleaning.

Contaminated air is directed through conduit 36 through a passage P11 in valve 38, conduit 110 to and through the filtering material in BED 3, conduit 108, a passage P12 in valve 60, and conduit 62 to the turbo expander 20 (FIG. 1). At the same time exhaust gases at about 600° F. and 35 psig. are directed from conduit 83, through a passage P13 in valve 86 which heats the filtering material in BED 1 by passing through the conduits 50 as indicated by the arrows in BED 1. The hot exhaust gases flow through conduit 88, a passage P14 in valve 90, and to the atmosphere through conduit 106. Purging air from conduit 78 is directed through a passage P15 in valve 60, through conduit 55, the filtering material in BED 1, conduit 54, and a passage P16 in valve 38 for discharge to the atmosphere through conduit 100.

Having reference to FIG. 4, after an additional time period of about seven seconds, contaminated air from conduit 36 is directed through a passage P17 in valve 38, through conduit 98, through the filtering material in BED 2, through conduit 96, a passageway P18 in valve 60 and thereafter directing the clean air through conduit 62 (FIGS. 1 and 4) and to the tuboexpander 20.

At the same time, BED 3 is being heated and purged by hot exhaust gas at about 600° F. from conduit 83, passageway P19 in valve 86, through conduit 102, into and through the conduits 50 in BED 3, and through conduit 104, a passage P24 in valve 90 and to the atmosphere through conduit 106, thereby heating the filtering material which enhances the removal of contaminates from the air when in the subsequent cleaning and filtering cycle.

While BED 2 is filtering and cleaning, and BED 3 is being purged and heated, BED 1 is being cooled. Cool clean purged air from conduit 84, flows through a passage P22 in the valve 86, through the conduits 50 into and through BED 1, conduit 54, a passage P16 in valve 38, and to the atmosphere through conduit 100.

The above sequence of operations are repeated continuously while in a contaminated atmosphere to provide cool clean air to the crew compartment of a vehicle. If outside air is cold or hot but does not contain contaminants, the pressure and temperature swing adsorption system of the present invention can be used as an air conditioner.

From the foregoing description it is apparent that the pressure and temperature swing adsorption system of the present invention includes three identical adsorption BEDS 1, 2 and 3, each of which sequentially filter and clean contaminated air by first filtering and cleaning the contaminants from the contaminated air, and directing most of the clean air to the crew compartment 74 of the vehicle. When a first bed is cleaning contaminants from the air, a second bed is being purged and heated by engine exhaust gases at 35 PSI and 600° F. which cleans all contaminants from the filtering material in the second bed. At the same time filtering material in the third bed is cleaned by cool clean air at 70° F. and 35 PSI which cools the air and completely cleans the filtering material, thus requiring no replacement of the bed unless damaged by other means.

It has been determined that the beds when using 200 cubic feet per minute of contaminated air moving through the system that 120 cubic feet per minute of clean air is directed into the crew compartment 74, 60 cubic feet per minute is used for purging the adsorption beds, and that only 20 cubic feet per minute is used for cooling the pressure swing adsorption beds during each cycle of operation.

Although the best mode contemplated for carrying out the present invention has been herein shown and described, it will be apparent that modification and variation may be made without departing from what is regarded to be the subject matter of the invention.

What is claimed is:

1. A method for purging contaminants from intake air and providing clean air, comprising the steps of:

directing intake air to a first adsorption bed at a first pressure wherein the intake air passes through the first adsorption bed in a first direction producing a clean air output;

stopping the flow of intake air to the first adsorption bed;

heating the first adsorption bed;

passing a portion of the clean air through the first adsorption bed in a second direction, wherein the second direction is opposite to the first direction and wherein the portion of the clean air is at a second pressure which is lower than the first pressure;

stopping the heating of the first adsorption bed;

cooling the first adsorption bed;

cooling the clean air to provide cooled clean air and wherein the step of cooling the first adsorption bed, comprises the step of passing the cooled clean air through the first adsorption bed at a third pressure which is lower than the first pressure; and heating a portion of the intake air, creating heated intake air and wherein the step of heating the first adsorption bed, comprises the steps of providing channels in the first adsorption bed, and passing the heated intake air through the channels in the first adsorption bed.

2. A method for purging contaminants from intake air and providing clean air, comprising the steps of:

directing intake air to a first adsorption bed at a first pressure wherein the intake air passes through the first adsorption bed in a first direction producing a clean air output;

stopping the flow of intake air to the first adsorption bed;

heating the first adsorption bed;

passing a portion of the clean air through the first adsorption bed in a second direction, wherein the second direction is opposite to the first direction and wherein the portion of the clean air is at a second pressure which is lower than the first pressure;

stopping the heating of the first adsorption bed;

cooling the first adsorption bed;

directing intake air to the second adsorption bed at the first pressure wherein the intake air passes through the first adsorption bed in a third direction producing a clean air output;

stopping the flow of intake air to the second adsorption bed;

heating the second adsorption bed;

passing a portion of the clean air from the first adsorption bed through the second adsorption bed in a fourth direction, wherein the fourth direction is opposite to the second direction and wherein the portion of the clean air is at the second pressure which is lower than the first pressure;

stopping the heating of the second adsorption bed;

cooling the second adsorption bed;

cooling the clean air to provide cooled clean air and wherein the step cooling the first adsorption bed, comprises the step of passing the cooled clean air through the first adsorption bed at a third pressure which is lower than the first pressure and wherein the step of cooling the second adsorption bed, comprises the step of passing the cooled clean air through the second adsorption bed at the third pressure which is lower than the first pressure;

heating a portion of the intake air, creating heated intake air and wherein the step of heating the first adsorption bed, comprises the steps of providing channels in the first adsorption bed, and passing the heated intake air through the channels in the first adsorption bed and wherein the step of heating the second adsorption bed, comprises the steps of providing channels in the second adsorption bed, and passing the heated intake air through the channels in the second adsorption bed.

3. An apparatus for purging contaminants from intake air and providing clean air, comprising:
a first adsorption bed;
means for directing intake air to the first adsorption bed at a first pressure wherein the intake air passes through the first adsorption bed in a first direction producing a clean air output;
means for stopping the flow of intake air to the first adsorption bed and heating the first adsorption bed and passing a portion of the clean air through the first adsorption bed in a second direction, wherein the second direction is opposite to the first direction and wherein the portion of the clean air is at a second pressure which is lower than the first pressure;
means for stopping the heating of the first adsorption bed, and cooling the first adsorption bed;
means for cooling the clean air to provide cooled clean air and wherein the means for stopping the heating of the first adsorption bed, comprises a means for passing the cooled clean air through the first adsorption bed at a third pressure which is lower than the first pressure; and
means for heating a portion of the intake air, creating heated intake air and wherein the means for stopping the flow of intake air to the first adsorption bed and heating the first adsorption bed, comprises channels in the first adsorption bed, and means for passing the heated intake air through the channels in the first adsorption bed.

4. An apparatus for purging contaminants from intake air and providing clean air, comprising:
a first adsorption bed;
means for directing intake air to the first adsorption bed at a first pressure wherein the intake air passes through the first adsorption bed in a first direction producing a clean air output;
means for stopping the flow of intake air to the first adsorption bed and heating the first adsorption bed and passing a portion of the clean air through the first adsorption bed in a second direction, wherein the second direction is opposite to the first direction and wherein the portion of the clean air is at a second pressure which is lower than the first pressure;
means for stopping the heating of the first adsorption bed, and cooling the first adsorption bed;
a second adsorption bed;
means for directing intake air to the second adsorption bed at the first pressure wherein the intake air passes through the second adsorption bed in a third direction producing clean air;
means for stopping the flow of intake air to the second adsorption bed and heating the second adsorption bed and passing a portion of the clean air from the first adsorption bed through the second adsorption bed in a fourth direction, wherein the fourth direction is opposite to the third direction and wherein the portion of the clean air is at the second pressure which is lower than the first pressure;
means for stopping the heating of the second adsorption bed, and cooling the second adsorption bed;
means for cooling the clean air to provide cooled clean air and wherein the means for stopping the heating of the first adsorption bed, comprises a means for passing the cooled clean air through the first adsorption bed at a third pressure which is lower than the first pressure and wherein the means for stopping the heating of the second adsorption bed, comprises a means for passing the cooled clean air through the second adsorption bed at the third pressure which is lower than the first pressure; and
means for heating a portion of the intake air, creating heated intake air and wherein the means for stopping the flow of intake air to the first adsorption bed and heating the first adsorption bed, comprises channels in the first adsorption bed, and means for passing the heated intake air through the channels in the first adsorption bed and wherein the means for stopping the flow of intake air to the second adsorption bed and heating the second adsorption bed, comprises channels in the second adsorption bed, and means for passing the heated intake air through the channels in the second adsorption bed.

* * * * *